United States Patent [19]

Owens

[11] Patent Number: 4,580,653
[45] Date of Patent: Apr. 8, 1986

[54] PORTABLE SPEAKER FOR VEHICLES

[76] Inventor: Patrick C. Owens, 6260 Greenwood Rd., Apt. 1006, Shreveport, La. 71119

[21] Appl. No.: 677,400

[22] Filed: Dec. 3, 1984

[51] Int. Cl.[4] .............................................. H05K 5/00
[52] U.S. Cl. ................................... 181/141; 181/145; 181/156; 181/199; 381/86
[58] Field of Search ........................ 181/141, 144–147, 181/150, 156, 199; 381/86; 179/146 R, 146 E

[56] References Cited

U.S. PATENT DOCUMENTS

| | | | |
|---|---|---|---|
| 1,580,220 | 4/1926 | Schwarze | 179/146 R X |
| 1,905,215 | 4/1933 | Cadieux | 179/146 E |
| 2,133,151 | 10/1938 | Rittenhouse | 179/146 R X |
| 3,283,848 | 11/1966 | Patti | 181/145 |
| 3,688,864 | 9/1972 | Guss | 181/145 X |
| 3,845,246 | 10/1974 | Ouvrier | 181/145 X |
| 4,136,755 | 1/1979 | Goes | 181/141 |
| 4,501,013 | 2/1985 | Sato | 381/86 |

Primary Examiner—Benjamin R. Fuller
Attorney, Agent, or Firm—John M. Harrison

[57] ABSTRACT

A portable speaker for vehicles which includes a shaped, box-like structure having front and rear sound chambers having top segments disposed in different planes and port holes communicating with the sound chambers, respectively, with front and rear speaker units provided in the respective sound chambers. In a preferred embodiment, the portable speaker is shaped to serve as an arm rest between bucket seats in a vehicle and can be positioned in several different configurations in order to provide sound of desired intensity and quality.

4 Claims, 11 Drawing Figures

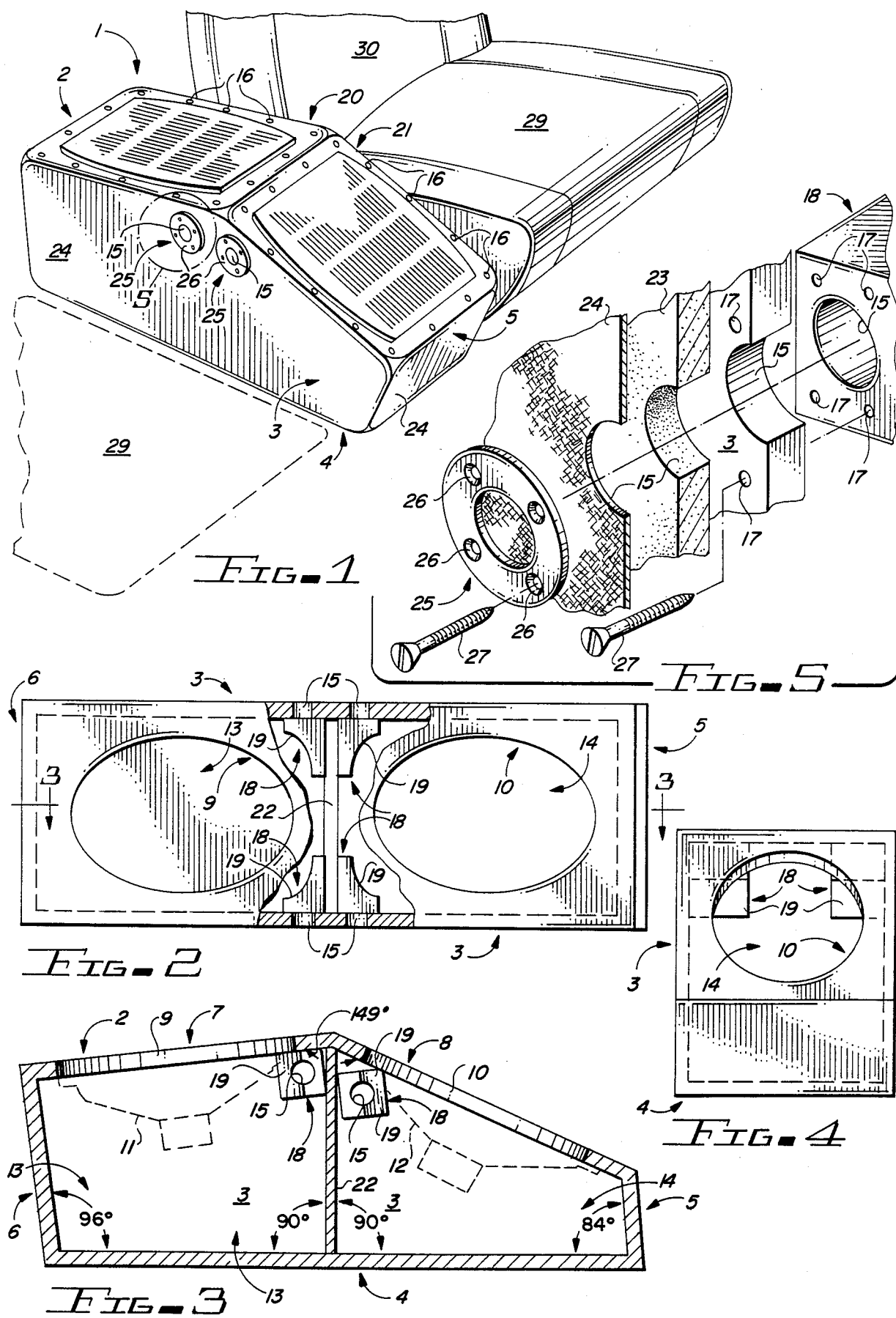

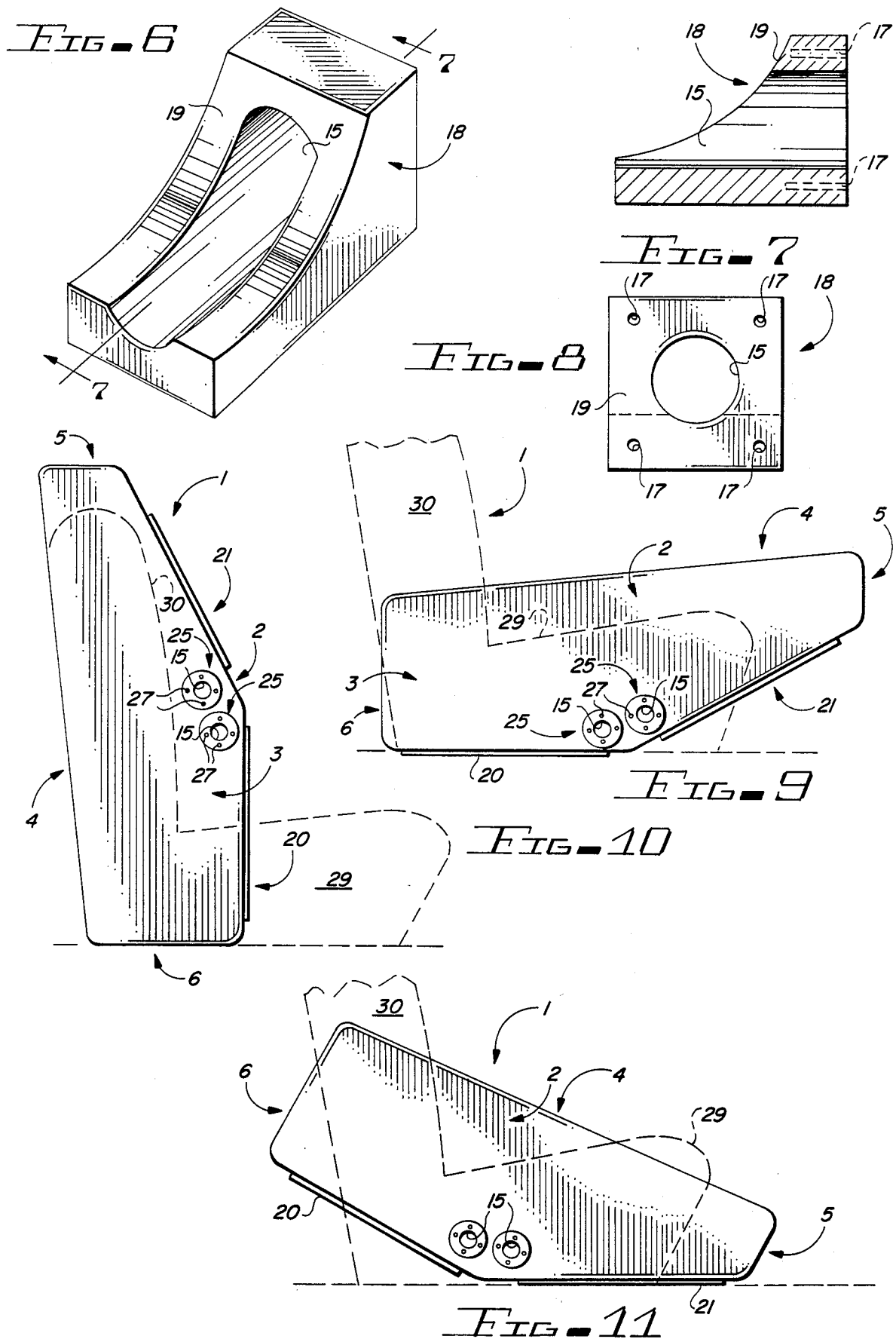

PORTABLE SPEAKER FOR VEHICLES

BACKGROUND OF THE INVENTION

Field of the Invention

This invention relates to speakers and speaker systems and more particularly, to a portable automobile speaker which is characterized by a shaped, box-like structure having the top segments of front and rear sound chambers disposed in different planes, with front and rear speaker units provided in the sound chambers, respectively, and separate, oppositely-disposed port holes communicating with the top and bottom sound chambers to facilitate entry and exit of air during operation of the speaker units. In a preferred embodiment of the invention the portable speaker is configured for disposition between the bucket seats in a vehicle and can be situated to rest on one of several surfaces in order to produce sound of desired intensity and quality.

In recent years there has developed a great demand for quality speaker systems in automobiles and other vehicles and particularly, for speakers which are portable. In a typical speaker system used in cooperation with sophisticated stereophonic amplifiers in modern vehicles, the speakers are located in strategic positions in order to enhance the quality of sound emitted therefrom. In most cases, these speakers are located in the doors and in the rear panel area adjacent the rear window, in order to provide a desired spacing necessary to enhance the quality of sound emitted from the speakers. Some installations feature separate speaker boxes or cabinets which are not permanently mounted to the vehicle doors or rear panel and which can be moved to various locations inside the vehicle in order to produce the desired sound effects. One of the problems associated with such speakers is the requirement of constant adjustment in order to maintain a proper spacing and positioning, since operation of the vehicle causes the speakers to move and bounce and redistributes the sound. Furthermore, each of the speakers must be wired to the amplifier and is therefore tethered in some manner to the speaker location, thereby limiting effective movement and repositioning of the speakers.

Accordingly, it is an object of this invention to provide a new and improved portable speaker for vehicles and particularly for vehicles which are designed with bucket seats, which speaker is characterized by a shaped box-like structure defining a front and rear sound chamber with front and rear speaker units located in the sound chambers, respectively, and separate port holes communicating with the respective sound chambers, to facilitate entry and exit of air to and from the sound chambers.

Another object of this invention is to provide a new and improved portable speaker for vehicles which includes a shaped, box-like structure having front and rear sound chambers with top segments disposed in different planes, and upper and lower speaker units disposed in the sound chambers, respectively, and further including a pair of oppositely disposed air ports communicating with each of the sound chambers in order to facilitate the entry and exit of air during speaker operation.

Still another object of the invention is to provide a portable speaker for vehicles and particularly vehicles having bucket seats, which speaker is shaped to define separate sound chambers, each fitted with a speaker unit and cooperating, oppositely-disposed air port holes communicating with the sound chambers, respectively, the portable speaker shaped for positioning between the bucket seats on various shaped surfaces to produce sound of desired intensity and quality in the vehicle.

A still further object of this invention is to provide a new and improved portable, shaped, box-like speaker for vehicles which speaker contains a pair of isolated speaker units and is capable of being removed from the vehicle and used outside of the vehicle, as desired.

Another object of this invention is to provide a new and improved portable speaker which is characterized by a pair of speaker units mounted in separate plenums defined by a shaped, box-like structure and separated by a partition, the plenums further provided with oppositely-disposed air port holes, respectively, in order to facilitate the entry and exit of air to and from the plenums, respectively, during operation of the portable speaker.

A still further object of this invention is to provide a new and improved portable speaker having separate sound chambers or plenums fitted with air ports and speaker units mounted in the plenums, the speaker unit grills situated in separate planes, which portable speaker can be used both inside and outside of an automobile or other vehicle and is particularly useful as an arm rest disposed between bucket seats and in various positions deployed on various surfaces, to produce sound from the port holes, the quality of which sound varies with the positioning of the speaker.

SUMMARY OF THE INVENTION

These and other objects of the invention are provided in a new and improved portable speaker for vehicles, which includes a shaped, generally box-like structure having a rear top segment and an adjacent front top segment tapering from the rear top segment, the structure enclosing a pair of separate sound chambers or plenums, each plenum having a speaker unit installed therein, the portable speaker further provided with oppositely-disposed air port holes communicating with each plenum, in order to facilitate entry and exit of air to and from the plenums during speaker operation, with a variation in sound quality and intensity determined by positioning the speaker on various surfaces provided on the speaker structure.

DESCRIPTION OF THE PRIOR ART

Many speakers and speaker systems for vehicles are known in the prior art. U.S. Pat. No. 1,580,220, dated Apr. 13, 1926, to H. Schwarze, discloses a "Telephone Installation" for vehicles, which is characterized by a telephone set which includes a receiver adjacent the driver's station and a transmitter conveniently located for the use of the passenger. A typical installation includes an enclosure which receives the telephone apparatus and conveniently provides an out-of-the-way location for the telephone. U.S. Pat. No. 1,905,215, dated Apr. 25, 1933, to J. O. Cadieux, discloses a "Telephone System and Apparatus" which is similar to the Schwarze system, in that it includes a built-in speaker and enclosure system for installing a telephone system in a vehicle. U.S. Pat. No. 2,133,151, dated Oct. 11, 1938, to P. Rittenhouse, details a "Radio Receiving System for Automobiles" which includes a loud speaker unit located in such a position in the vehicle that the aural reception is approximately the same as to volume and fidelity of acoustical reproduction, for all occupants, wherever located in one or more seats in the vehicle. The speaker is provided in an enclosure in order to more easily mount it either on one of the seats or in the dash of the vehicle. French Pat. No. 2,343,389, discloses a mount for radios which includes a speaker and an enclosure of relatively small size for positioning in a desired location in the vehicle.

BRIEF DESCRIPTION OF THE DRAWINGS

The invention will be better understood by reference to the drawings, wherein:

FIG. 1 is a perspective view, partially in section, of a preferred embodiment of the portable speaker in position between bucket seats in a vehicle;

FIG. 2 is a top elevation, partially in section, of the speaker illustrated in FIG. 1;

FIG. 3 is a side sectional view, taken along lines 3—3 in FIG. 2;

FIG. 4 is a front end elevation of the speaker illustrated in FIG. 1 with the upholstery foam and cover, the speaker units and the speaker grill removed;

FIG. 5 is a sectional view of a preferred speaker construction;

FIG. 6 is a perspective, exploded sectional view of a port hole block used to facilitate portholes in the portable of this invention;

FIG. 7 is a sectional view taken along lines 7—7 in FIG. 6 of the port hole block illustrated in FIG. 6;

FIG. 8 is a front elevation of the port hole block illustrated in FIGS. 6 and 7;

FIG. 9 is a side view of a second preferred speaker orientation in the vehicle;

FIG. 10 represents a third preferred position of the portable speaker in a vehicle; and FIG. 11 is a fourth preferred embodiment of the portable speaker located in the vehicle.

DESCRIPTION OF THE PREFERRED EMBODIMENTS

Referring initially to FIGS. 1-3 of the drawings, the portable speaker of this invention is generally illustrated by reference numeral 1 and is characterized by a shaped enclosures 2, defined by parallel sides 3, a generally flat bottom 4 and generally parallel front end 5 and base end 6. As is more particularly illustrated in FIG. 3 of the drawings, a rear top segment 7 extends from the base end 6 of the enclosure 2, to a partition 22, which extends from the bottom 4, to define a rear sound chamber 13. Furthermore, a frontal top segment 8 tapers from the partition 22 to the front end 5, to enclose and define a separate front sound chamber 14. In a most preferred embodiment of the invention the front end 5 extends from the bottom 4 at a first angle of about 84 degrees and the base end 6 extends from the bottom 4 at a second angle of about 96 degrees. Furthermore, the frontal top segment 8 extends from the rear top segment 7 to the front end 5 at a third angle of about 149 degrees with respect to the rear top segment 7 and the partition 22 is therefore-most preferably fastened to the bottom 4 in perpendicular relationship and joins the rear top segment 7 and the frontal top segment 8 at the third angle, as heretofore described. The rear top segment 7 is provided with a rear speaker opening 9, which faces a rear speaker unit 11 and the frontal top segment 8 is provided with a front speaker opening 10, which accommodates a front speaker unit 12. Referring again to FIG. 1, in another most preferred embodiment of the invention a rear speaker grill 20 covers the rear speaker opening 9 and protects the rear speaker unit 11, while a front speaker grill 21 covers the front speaker opening 10 and likewise protects the front speaker unit 12. As in the case of conventional speakers, the grill fasteners 16, which may be wood screws or like fasteners, are used to secure the rear speaker grill 20 to the rear top segment 7 and the front speaker grill 21 to the frontal top segment 8, of the portable speaker 1.

Referring now to FIGS. 1 and 2-8 of the drawings, in another most preferred embodiment of the invention a port hole 15 is provided in each of the sides 3 in oppositely-disposed relationship communicating with both the rear sound chamber 13 and the front sound chamber 14, respectively. As further illustrated in FIG. 5, each port hole 15 is provided in a port hole block 18 which is fitted with a radius 19 on one surface thereof, to accommodate the rear speaker unit 11 and the front speaker unit 12, as also illustrated in FIG. 2. Each port hole 15 also extends through the sides 3 of the enclosure 2, and the upholstery foam 23, more particularly illustrated in FIG. 1, and also through the upholstery 24, enclosing the upholstery foam 23 and terminates in a port hole cover 25, which is secured to the port hole blocks 18 by means of wood screws 27. Fastener apertures 17 in the port hole blocks 18 and cover apertures 26, align the wood screws 27 through the port hole cover 25, sides 3 and the port hole blocks 18. Accordingly, in another preferred embodiment of the invention the entire portable speaker enclosure 2 is covered with the upholstery cover 24, which in turn, covers the upholstery foam 23. The upholstery cover 24 is situated around the bottom 4, sides 3, front end 5 and the base end 6 and is folded beneath the rear speaker grill 20 and the front speaker grill 21 and is secured to the enclosure 2 by means of the grill fasteners 16, as illustrated in FIG. 1.

Referring now to FIGS. 1 and 9-11 of the drawings, it will be appreciated by those skilled in the art that various positioning of the portable speaker 1 results in a variation in the intensity and quality of sound emitted from the rear speaker unit 11 and the front speaker unit 12. For example, referring initially to FIG. 1, positioning of the portable speaker 1 resting on the bottom 4 of the enclosure 2 between the vehicle seats 29, facilitates a relatively evenly distributed sound of high intensity at any given volume setting of the amplifier, since both the front speaker unit 12 and the rear speaker unit 11 are unobstructed and are facing upwardly and forwardly to evenly distribute the sound. Referring now to FIG. 9 of the drawing, when the portable speaker 1 is turned to the position illustrated, resting on the rear speaker grill 20, it will be appreciated that the sound emitted from the rear speaker unit 11 is muted, while the sound emitted from the front speaker unit 12 is directed downwardly toward the floor of the vehicle, to reduce the intensity of the sound from the portable speaker 1. Accordingly, when the portable speaker 1 is in the position illustrated in FIG. 9, the sound is lessened in intensity, producing a softer effect for a selected setting of the amplifier controls. Referring now to FIG. 10 of the drawings, when the portable speaker 1 is positioned on the base end 6 with the sides 3 substantially parallel to the back rest 30 of the vehicle seat 29, both the rear speaker unit 11 and the front speaker unit 12 are positioned in a forward direction toward the dash of the vehicle and a sound of higher intensity and better quality is realized. As illustrated in FIG. 11, a highly muted, low intensity sound can be realized by positioning the portable speaker 1 such that the enclosure 2 is fitted between the vehicle seats 29 resting on the front speaker grill 21, with the sound emitted from the rear speaker 11 directed downwardly and away from the listeners.

In yet another preferred embodiment of the invention a long speaker wire is provided between the portable speaker 1 and the amplifier, such that the portable speaker 1 can be removed from the vehicle and positioned on the hood or top of the vehicle or at a distance from the vehicle and still operate by manipulation of the amplifier controls in the vehicle. As in the positioning of the portable speaker 1 on various surfaces of the vehicle, the portable speaker 1 can also be varied in position, as illustrated in FIG. 1 and FIGS. 9-11, to produce a desired intensity and sound quality to suit the occasion.

I claim:

1. A portable speaker for vehicles comprising a shaped enclosure having a top rear speaker surface; a top rear opening in said top rear speaker surface; a rear sound chamber communicating with said top rear opening; a rear speaker in said rear sound chamber, said rear speaker facing said top rear opening; a top front speaker surface in said shaped enclosure, said top front speaker surface describing an angle of about 149° with respect to said top rear speaker surface; a top front opening in said top front speaker surface; a front sound chamber communicating with said front sound chamber, said front speaker facing said top front opening; a pair of first portholes communicating with said rear sound chamber in opppositely disposed relationship and a pair of second portholes communicating with said front sound chamber in oppositely-disposed relationship.

2. The portable speaker of claim 1 further comprising padding and upholstery material on said shaped enclosure.

3. A portable speaker for vehicles comprising a shaped enclosure; a front sound chamber in said enclosure with a front speaker surface provided in said enclosure and closing said front sound chamber; a front speaker located in said front sound chamber and carried by said front speaker surface; a first set of portholes provided in said enclosure and communicating with said front sound chamber in oppositely-disposed relationship; a rear sound chamber provided in said enclosure, said rear sound chamber separated from said front sound chamber with a rear speaker surface closing said rear sound chamber and describing an angle of about 149° with respect to said front speaker surface; a rear speaker located in said rear sound chamber and carried by said rear speaker surface; and a second set of portholes provided in said enclosure and communicating with said rear sound chamber in oppositely-disposed relationship, whereby air is permited to flow into and out of said front sound chamber through said first set of portholes and air is permitted to flow into and out of said rear sound chamber through said second set of portholes.

4. The portable speaker of claim 3 further comprising padding and upholstery material on said shaped enclosure.

* * * * *